United States Patent [19]

Vlasnik

[11] 4,122,012
[45] Oct. 24, 1978

[54] SEA WATER DESALINIZATION SYSTEM

[76] Inventor: Lincoln A. Vlasnik, 1422 Beckwith Ave., Los Angeles, Calif. 90049

[21] Appl. No.: 819,580

[22] Filed: Jul. 27, 1977

[51] Int. Cl.² ............................................. E02B 11/00
[52] U.S. Cl. .................................... 210/170; 405/52
[58] Field of Search ........................ 210/24, 170, 321; 61/1 R

[56] References Cited
PUBLICATIONS

Civil Engineering-ASCE "Seacoast dam Separates Salt Water and Fresh", Feb. 1974, pp. 53–55.

*Primary Examiner*—Charles N. Hart
*Assistant Examiner*—E. Rollins Gross
*Attorney, Agent, or Firm*—Keith D. Beecher

[57] ABSTRACT

A system for the desalinization of sea water is provided, which includes a barrier buried to a depth below the low tide water level in a sandy beach, and a collector vault, or well, buried in the beach behind the barrier, the vault having an opening in its side for receiving water passing through the barrier. The barrier is filled with selected filter materials, and the sand in the area between the barrier and the vault is treated with a selected material. After a period of pumping, desalinated water will appear in the vault and may be pumped out of the vault. Whenever the water in the vault is pumped below a particular level, a new supply of desalinated water will flow in through the opening in its side from the barrier.

9 Claims, 1 Drawing Figure

U.S. Patent
Oct. 24, 1978
4,122,012
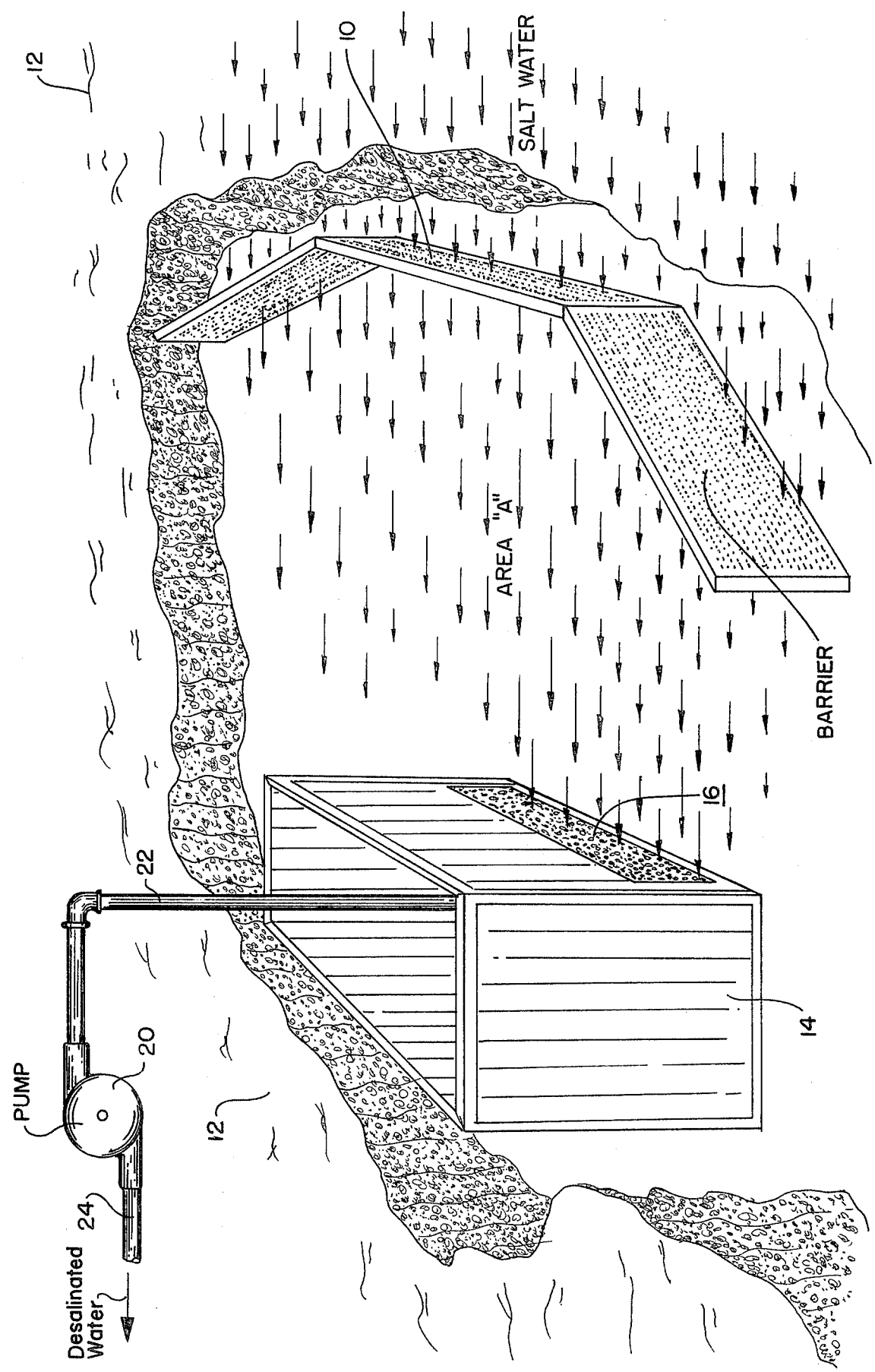

SEA WATER DESALINIZATION SYSTEM

BACKGROUND OF THE INVENTION

The term "sea water" as used herein is intended to refer to ocean water, and the like, having a sufficiently high total dissolved solid content so that the water is unusable for agricultural purposes. The term "desalinated water" used herein is intended to refer to water in which the total dissolved solids are reduced to a level sufficient to render the water at least suitable for irrigation purposes.

The system of the present invention has general utility in that it enables desalinated water to be produced in any desired quantity at negligible cost. The system is advantageous in that apart from pumps, it does not entail any moving parts; nor does it require the introduction of heat, pressure or electricity from external power sources. In addition, the system of the invention has the capability of operating over prolonged periods of time without any noticeable deterioration of its components, and without the need for any substantial maintenance or servicing operations. In addition, the system of the invention has an advantage in that it utilizes relatively inexpensive and readily available materials in accomplishing its desired results.

Although the theoretical principles upon which the operation of the system of the invention is predicated are not completely understood, it is believed that the filter materials contained in the barrier which, in accordance with the concepts of the invention, are imbedded in the sand of a beach, set up an ion-exchange reaction in the saline or brackish solution passing through the barrier, and this ion-exchange reaction causes a desalinated water separation, with the lighter desalinated water flowing above the heavier brine or brackish solution through the sand and into the opening in the vault, which is also imbedded in the sand. The desalinated water passes through the opening in the side of the vault and into its interior, whereas the heavier brine solution is dispersed in the sand under the barrier and the vault; or may be pumped to waste through an appropriate drainage system installed below the level of the barrier and the vault opening.

Also, the sap of the guayule plant, family asteraceae, genus parthenium argentatum, is placed in the sand between the barrier and the vault, and this sap reacts with residual compounds in the sea or brackish water after passing through the barrier to cause such heavier materials to gravitate down into the brine solution underlying the upper layer of desalinated water. The only maintenance required in the system is to add additional sap to the area after several months of operation. The quantity of sap to be used, and the quantities of the materials in the barrier are not critical. The addition of the guayule sap to the area between the barrier and the vault opening also serves as an organic wetting agent and increases the water velocity through the intervening sand. Should these sands be very small and dense, thereby greatly retarding water flow, replacement with small size gravel is desirable to increase the water velocity. Guayule sap at the rate of 100 liters per cubic meter of the sand between the barrier and vault opening has proven very effective in producing desalinated water of a potable quality as low as 55 parts per million. In the event water quality should decrease, the addition of guayule sap to the filter materials in the barrier may be effected to re-enforce the desalinating performance of the system.

BRIEF DESCRIPTION OF THE DRAWING

The FIGURE is a schematic representation of one embodiment of the invention.

DETAILED DESCRIPTION OF THE ILLUSTRATED EMBODIMENT

As shown in the figure, a barrier 10 is imbedded in a sandy beach 12 between an adjacent body of salt water and a vault 14. The vault 14 is also imbedded in the sand of the beach, and is displaced from the barrier 10 so as to provide an area "A" between the front side of the vault and the barrier. An opening 16 is provided in the front side of the vault, which opening may be covered with an appropriate screen to keep the sand out of the vault.

The barrier 10 is imbedded at a selected depth under the sand of the beach, so that at low tide and high tide, all water flowing under the sand to the opening 16, flows through the barrier. The vault 14 is displaced upwardly with respect to the barrier so that only the upper layer of water passing through the barrier passes through the opening 16, with the lower layer of water flowing under the vault. A pump 20 is provided for pumping desalinated water out of the vault through an inlet pipe 22 and out an outlet pipe 24.

Water velocity entering the vault opening 16 is controlled by the rate of the pump 20. Different sands have different permeability. Porous sand induces a slower rate of water flow; crystal sand increases the water velocity. To compensate for these differing rates of water passage through the intervening sand, the thickness of the filter barrier 10 may be varid. For example, crystal sand requires a barrier approximately 12 inches thick, whereas porous sand requires a barrier approximately 9 inches thick.

As described above, selected materials are included in the barrier 10 which react with the salt water to help form a layer of desalinated water over a layer of brine solution. Whenever the level of water in the vault 14 is pumped below the level of the surrounding water table, the desalinated water flows through the opening 16 into the vault, so that desalinated water may be continuously pumped out of the vault by pump 20 at controlled rates.

The addition of guayule sap to the area "A," or similar reacting genus of the families asteraceae or euphorbiaceae, as described above, further assists in separating dissolved compounds from the layer of desalinated water into the underlying layer of brine solution, thence through the drainage system to waste. Throughout area "A" and at the front of the vault 14, the heavier saline solution gravitates downward and is dispersed into the underlying sands, thence to be discharged into a channel or drain, designed so as to draw off this heavier liquid brine.

The filter materials contained in the barrier 10 comprises three separate constituents which may be chunks of about ⅜ inches diameter, for example, or crushed into a granular form. The materials may be intermixed into one barrier wall, or kept separate in three parallel barrier walls. The materials consist of ferrous oxide; carbon; and either pumice and/or natural sulphur. Coke may be used as the carbon material, and red volcanic cinder may be used as the ferrous oxide material.

The sap of the guayule plant, parthenium argentatum of the family asteraceae, is composed of the following constituents (by weight): citric acid — 77%; hydrobromide — 3-½%; sodium citrate — 17%; acetone — 1-½%; and yellow phenolphlein — 1%.

When the contents of the vault 14 are pumped out, water will flow into the vault through opening 16 to re-establish the static water level in the vault. The barrier 10 is buried in the sand between the ocean and the vault 14, or completely surrounding the vault if so desired, with the vault being separated from the barrier, as shown, by approximately 10 meters. The barrier 10 may be formed of plastic boxes which are closely fitted together to form a solid wall. The sides of the boxes are perforated to permit the sea water to flow through the barrier 10 and across area "A" into the vault 14, whenever the water level in the vault is pumped below the static level of the surrounding water table, which will vary with the degree of tide.

The barrier boxes are filled with the selected mixed filter materials. These materials do not dissolve, but act as a means to help separate the desalinated water from the saline solution, as explained above. As also explained, the area "A" between the barrier 10 and the vault 14 is treated with a purifying agent which acts further to keep separate dissolved compounds from the desalinated water, as the water passes into the opening 16 in vault 14.

The invention provides, therefore, a practical inexpensive system for rejecting the saline constituents of sea water in order to produce desalinated water appropriate for irrigation and other purposes. The system, as described, is intended to operate under the sand of an ocean or other beach where salt water normally underlies the sand. The vault 14 is buried in the beach sand, for example, 500 feet or less inland from the low tide level to a depth where the opening 16 in the side of the vault is located, for example, about 4 feet below the low tide level.

A second embodiment of the invention, not generally adaptable to larger quantities of production, consists in digging a well of desired diameter in a sandy ocean beach to such depth as will assure there being a continuous supply of ocean water attracted thereto, no matter what tide there is.

A porus material, such as pumice red volcanic cinder, is placed in a continuous layer over the bottom of the well and firmly positioned adjoining all sides of the well, in such a manner as will prevent any new water coming into the well without first passing through the layer of pumice or other similar material.

Next, a quantity of guayule sap is added to the water of the well in such a quantity as will assure the formation of a rubber-like film over all the pumice and up the sides of the well to high tide level.

Slowly the existing sea water is pumped from the well. As new sea water attempts to replace that which has been pumped out of the well, the compounds in the sea water are rejected by the ion-exchange action of the rubber-like film so that much of the saline fraction is excluded, leaving a product water of potable quality as relates to salinity. A pump-actuated drain positioned below the sandy bottom of the shallow well serves to control any build-up of objectionable quantities of brine in this area and the evacuation thereof to waste can be timed with the pumping of the product water from the well.

As pumping of the desalinated water from the well continues, additional sea water seeks to achieve a static level in the well. After salinity readings signify a rising salinity in the product water, additional guayule sap should be added to the bottom of the well which time-lapse will be determined by the quantity of water pumped. A gallon of sap will produce approximately 265 gallons of desalted water per day over a period of 3 months. A controlled pumping rate is essential so as not to overcome the rejection rate of the guayule sap film or sap of other rubber-like plants possessing the desalting characteristics or modifications that are intended to be covered under this invention.

A practical further embodiment of the invention previously described pertains to cleaning, sanitizing or rejuvenating ground water wells that have developed these defects: sea water intrusion; increasing mineral content; scale or rust; iron bacteria; unpleasant scum, odor, color and taste. Using standard cleaning agents, well-documented in the well cleaning industry, the water well is thoroughly cleansed, and the wash water pumped to waste. Next, pumice or other similar porous materials are positioned approximately 1 inch thick over the bottom of the well and through the various perforated sections; guayule or similar sap of a quantity sufficient to thoroughly coat all the surfaces that the well water contacts, is mixed with the volume of water in the well, pumped up and down in the well casing, coating all surfaces and forced back into the water-producing structures.

A program of such pumping for 1 hour, four times daily and for three consecutive days is generally sufficient to thoroughly build up a strong film over all metal surfaces and impregnate the pumice and water bearing sands. Most saline intrusion will be rejected by this film and iron bacteria will be denied the opportunity to attack the metals. Such a treatment will last for at least one year and to as long as three years, depending upon the water production and rapidity of pump action.

Although particular embodiments of the process of the invention have been described, the claims of the process are intended to cover all forms of desalination of sea or brackish water using the sap, in whatever form or condition utilized, of the guayule, genus parthenium argentation, family asteraceae; goldenrod, genus solidago; genus euphorbia, family euphorbiaceae; or other similar reacting sap of rubber plant genus, such as hevea brasiliensis.

While a particular embodiment of the invention has been shown and described, modifications may be made. The following claims are intended to cover all such modifications as fall within the spirit and scope of the invention.

What is claimed is:

1. A system of the desalinization of salt water, the system being installed in a sandy beach adjacent to a body of salt water, said system including: a barrier imbedded in the beach at a depth corresponding to the changing levels of salt water in the beach; a vault installed in the beach behind the barrier to receive water which has passed through the barrier; selected filter materials contained in the barrier; and a selected water purifying material positioned between the vault and the barrier.

2. The system defined in claim 1, in which the filter materials include carbon and ferrous oxide.

3. The system defined in claim 1, in which the filter materials include coke and red volcanic cinder.

4. The system defined in claim 3, in which the filter material also includes pumice.

5. The system defined in claim 3, in which the filter material further inclues natural sulphur.

6. The system defined in claim 1, in which the filter materials include the following constituents intermixed with one another: coke, red volcanic cinder, pumice and natural sulphur.

7. The system defined in claim 1, in which the material contained in the area between the vault and the barrier may comprise the sap of the guayule plant, genus parthenium argentatum, family asteraceae; or goldenrod, genus solidago; genus euphorbia, family euphorbiaceae; or other rubber plant genus, such as hezea brasiliensis.

8. The system defined in claim 1, in which the vault is separated from the barrier by beach sand, and in which the vault has an opening in a side thereof positioned to receive the water that has passed through the barrier.

9. The system defined in claim 1, in which the barrier forms the walls of the vault, and the water purifying material forms a film over the wall surface of the vault.

* * * * *